United States Patent
Penn et al.

(10) Patent No.: US 7,230,656 B2
(45) Date of Patent: Jun. 12, 2007

(54) SEQUENTIAL COLOR FILTER

(75) Inventors: Steven M. Penn, Plano, TX (US); Michael T. Davis, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 741 days.

(21) Appl. No.: 10/011,110

(22) Filed: Nov. 13, 2001

(65) Prior Publication Data

US 2002/0093499 A1 Jul. 18, 2002

Related U.S. Application Data

(60) Provisional application No. 60/250,557, filed on Nov. 30, 2000.

(51) Int. Cl.
*H04N 9/12* (2006.01)

(52) U.S. Cl. .................................... 348/743

(58) Field of Classification Search ............... 348/743, 348/742, 771; 353/84, 31, 20, 34, 37; 359/887, 359/891
See application file for complete search history.

(56) References Cited

U.S. PATENT DOCUMENTS

| | | | |
|---|---|---|---|
| 5,061,049 A | 10/1991 | Hornbeck | |
| 5,103,301 A * | 4/1992 | Cosentino | 348/217.1 |
| 5,371,543 A | 12/1994 | Anderson | |
| 5,448,314 A | 9/1995 | Heimbuch et al. | |
| 5,463,433 A * | 10/1995 | Koo | 353/84 |
| 5,583,688 A | 12/1996 | Hornbeck | |
| 5,592,188 A | 1/1997 | Doherty et al. | |
| 5,612,753 A | 3/1997 | Poradish et al. | |
| 5,806,950 A * | 9/1998 | Gale et al. | 353/78 |
| 5,863,125 A * | 1/1999 | Doany | 353/84 |
| 6,048,080 A * | 4/2000 | Belliveau | 362/282 |
| 6,419,365 B1 * | 7/2002 | Potekev et al. | 353/98 |
| 6,467,910 B1 * | 10/2002 | Sato | 353/84 |
| 6,755,554 B2 * | 6/2004 | Ohmae et al. | 362/293 |

FOREIGN PATENT DOCUMENTS

JP 07264605 A * 10/1995

OTHER PUBLICATIONS

U.S. Appl. No. 09/705,467, filed Nov. 3, 2000, Dewald et al.
U.S. Appl. No. 09/746,307, filed Dec. 21, 2000, Tew.

* cited by examiner

*Primary Examiner*—Paulos Natnael
(74) *Attorney, Agent, or Firm*—Charles A. Brill; Wade James Brady, III; Frederick J. Telecky, Jr.

(57) ABSTRACT

A sequential color filter and display system. The sequential color filter comprising: a set of at least three color filters (102). The color filters can be arranged in a cylindrical configuration and may have a cooling fan (506) attached. The set of color filters typically comprises a red filter, a green filter, and a blue filter, and can comprise a red filter, a green filter, a blue filter, and a clear filter. A motor may be connected to the set of color filters for rotating the set of color filters and the cooling fan about a common axis. The color filters may be arranged in a spiral configuration when a cylindrical sequential color filter is provided. The preceding abstract is submitted with the understanding that it only will be used to assist in determining, from a cursory inspection, the nature and gist of the technical disclosure as described in 37 C.F.R. § 1.72(b). In no case should this abstract be used for interpreting the scope of any patent claims.

94 Claims, 4 Drawing Sheets

SEQUENTIAL COLOR FILTER

CROSS-REFERENCE TO RELATED APPLICATIONS

This application claims priority under 35 USC § 119(e)(1) of provisional application number 60/250,557 filed Nov. 30, 2000.

The following patents and/or commonly assigned patent applications are hereby incorporated herein by reference:

| Patent No. | Filing Date | Issue Date | Title |
| --- | --- | --- | --- |
| 5,061,049 | Sept. 13, 1990 | Oct. 29, 1991 | Spatial Light Modulator and Method |
| 5,448,314 | Jan. 7, 1994 | Sept. 5, 1995 | Method and Apparatus for Sequential Color Imaging |
| 5,583,688 | Dec. 21, 1993 | Dec. 10, 1996 | Multi-Level Digital Micromirror Device |
| 5,371,543 | Aug. 17, 1993 | Dec. 6, 1994 | Monolithic Color Wheel |
| 5,592,188 | Jan. 4, 1995 | Jan. 7, 1997 | Method And System For Accentuating Intense White Display Areas In Sequential DMD Video Systems |
| 5,612,753 | Jan. 27, 1995 | March 18, 1997 | Full-Color Projection Display System Using Two Light Modulators |
| 60/173,859 | Dec. 30, 1999 | | Falling Raster Display System And Color Wheel |
| TI-29879 | Nov. 2, 2000 | | Sequential Color Recapture for Projection Systems |

FIELD OF THE INVENTION

This invention relates to the field of display systems, more particularly to sequential color display systems.

BACKGROUND OF THE INVENTION

Sequential color display system typically use a color wheel to filter a white light beam into a light beam having a sequence of at least three colors. The light beam is spatially modulated to produce an image. The modulator is synchronized with the color wheel so that a series of monochromatic images are formed. The persistence of the viewer's eye is used to integrate the monochromatic images and provide the perception of a full color image.

The use of a color wheel has several disadvantages. The primary disadvantage is that only about one-third of the light produced by the light source is used. The other two-thirds are filtered from the light beam by the color wheel and converted to heat by absorption in the system. Because only one-third of the light is used, a higher intensity light source is required to produce a given image brightness. The higher intensity light source requires more energy to operate and creates a much larger thermal load on the display system. Cooling the light source and the thermal load from the unused light requires a significant amount of energy which itself produces heat due to the inefficiency of the system. Additionally, the cooling fans and air plenums require a significant amount of space in the display system and create a significant amount of noise.

Color wheels are also inefficient when used with a field addressed modulator such as a micromirror device. The transitions between the various color filters require the modulator to be turned off to avoid creating mixed color images. Some display systems use the transition or spoke light to form secondary color images or white or gray scale images, but these systems require a significant amount of processing power to be devoted to the calculations necessary to utilize the spoke light. Scrolling color systems image the multiple colors of the color wheel onto the modulator and provide single-color image data to the modulator elements on either side of the filter transitions. The image data is changed as the filter transition sweeps across the face of the modulator.

Unfortunately, typical color wheels produce pie-shaped color segments as they sweep across the face of the modulator. Modulators such as the typical micromirror device group several rows of modulator element in a reset group and operate the entire reset group in concert. The pie-shaped segments create inefficiencies in this type of modulator since the entire reset group is turned off when the spoke sweeps across any portion of the group. Thus, pie-shaped filter segments often require two or more reset groups to be turned off for each spoke.

Color wheels that minimize the tilt of the filter transition relative to the rows of modulator elements, such as the spiral of Achimedes color wheels or barber pole style cylindrical drums are desired. These color wheels maximize light passing through the color wheel that is able to be used by a rasterized modulator. The combination of relatively small filter interfaces lined up with the grouping of the modulator elements and color filter segments small enough to allow one of each color to simultaneously be in the light path, enables the use of the sequential color filter in a highly efficient scrolling light recycling system.

What is needed is an improvement of the existing color wheels that minimizes the load on the display system power and cooling resources while providing more efficient optical operation with row-based spatial light modulators.

SUMMARY OF THE INVENTION

Objects and advantages will be obvious, and will in part appear hereinafter and will be accomplished by the present invention which provides a method and system for a sequential color filter. One embodiment of the claimed invention provides a sequential color filter comprising: a set of at least three color filters; a cooling fan connected to the set of color filters; and a motor for rotating the set of color filters and the cooling fan about a common axis. The set of color filters typically comprises a red filter, a green filter, and a blue filter, and can comprise a red filter, a green filter, a blue filter, and a clear filter.

According to another embodiment of the disclosed invention, a sequential color filter is provided. The sequential color filter comprises: a set of at least three color filters forming a cylinder. The set of color filters typically comprises a red filter, a green filter, and a blue filter, and can comprise a red filter, a green filter, a blue filter, and a clear filter. A motor typically is used to rotate the set of color filters According to another embodiment of the disclosed invention, a sequential color filter is provided. The sequential color filter comprises: a set of at least three color filters and a cooling fan connected to the set of color filters. A motor typically is used to rotate the set of color filters and the cooling fan about a common axis. The set of color filters typically comprises a red filter, a green filter, and a blue filter, and can comprise a red filter, a green filter, a blue filter, and a clear filter.

According to another embodiment of the disclosed invention, a display system is provided. The display system comprises a light source, a sequential color filter, a cooling fan, a motor, a spatial light modulator, and a projection lens. The light source generates a beam of white light. The sequential color filter filters the beam of white light to create a sequentially colored beam of light. The spatial light modulator modulates the sequentially colored beam of light, and the projection lens focuses the modulated light on an image plane.

According to another embodiment of the disclosed invention, a display system is provided. The display system comprises a light source, a sequential color filter, a motor, a spatial light modulator, and a projection lens. The light source generates a beam of white light. The sequential color filter filters the beam of white light to create a sequentially colored beam of light. The spatial light modulator modulates the sequentially colored beam of light, and the projection lens focuses the modulated light on an image plane.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
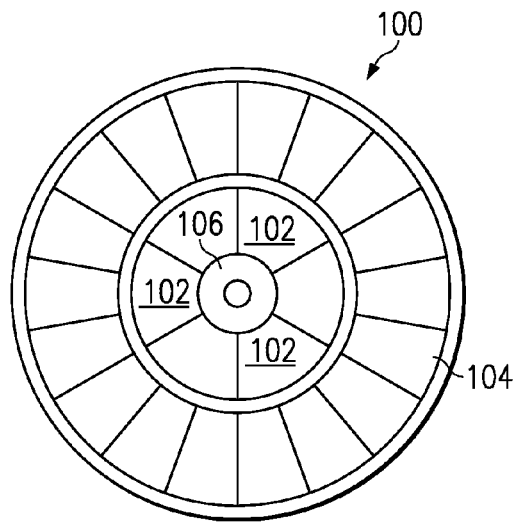
FIG. 1 is a plan view of a sequential color filter having a cooling fan on the periphery of the filter portion.

FIG. 1 is a plan view of a sequential color filter 100 having a cooling fan 104 on the periphery of the filter portion according to one embodiment of the disclosed invention. In FIG. 1, a series of color filter segments 102 are arranged around a hub 106 portion. The filter segments are each designed to reflect or transmit light over a particular band of wavelengths. These bands of wavelengths typically are a set of colors such as red, green, and blue, or cyan, yellow, and magenta, or a combination thereof. A set of filters commonly includes multiple segments of the same color, as well as clear segments.

The color filter segments can be fabricated separately and assembled to form the sequential color filter 100 shown in FIG. 1, or may be fabricated on a single monolithic substrate. For example, the filter segments each can be a dichroic filter deposited on a glass or other transparent substrate. If reflective filter segments are used, the substrate need not be transparent. The hub 106 portion of the sequential color filter 100 can be a region of the substrate on which the color filters are formed rather than a separate structure.

Surrounding the central color filter portion of the sequential color filter 100 is a cooling fan 104. Attaching the cooling fan directly to the sequential color filter allows a single motor to drive both the color filter segments and a cooling fan. This not only lowers the number of parts in the system, it can also save energy and lower the noise produced by the system. Additionally, an integrated color filter and cooling fan enables reducing the size of the display system and, in some situations, can provide more direct flow of cooling air to the light source.

Although not shown in FIG. 1 or any of the following figures, the impeller of the fan 104 typically is positioned in a housing. The housing is part of the system, rather than part of the color wheel or fan impeller, and typically is required to achieve sufficient cooling air flow.

Figure 2:
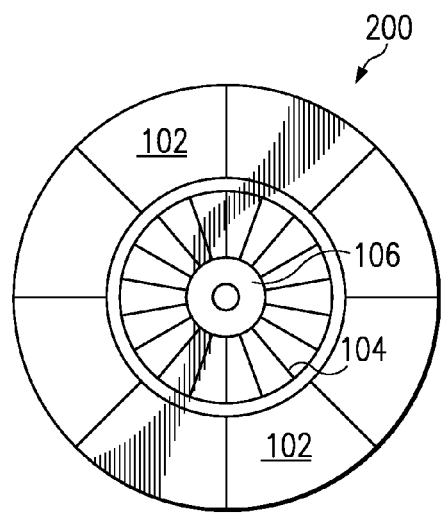
FIG. 2 is a plan view of a sequential color filter having a cooling fan on an inner portion of the filter portion.

FIG. 2 is a plan view of a sequential color filter 200 having a cooling fan in an inner portion of the filter portion. The embodiment shown in FIG. 2 is similar to the first embodiment shown in FIG. 1, with a series of color filter segments 102 arranged around the perimeter of the cooling fan 104. The cooling fan 104 includes the hub portion 106 of the sequential color filter. The embodiment of FIG. 2 provides the cooling air stream alongside the light path rather than surrounding the light path.

Figure 3:
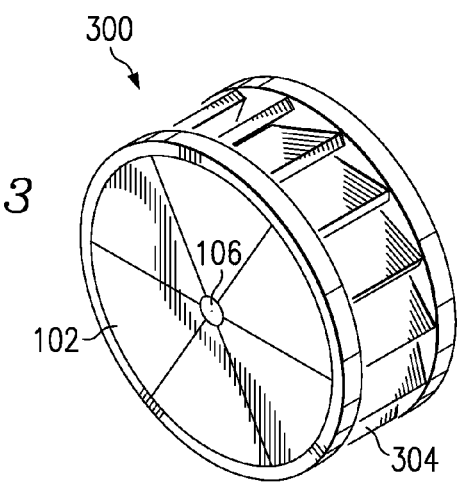
FIG. 3 is a perspective view of a planar sequential color filter having a squirrel-cage style cooling fan attached thereto.

FIG. 3 is a perspective view of a planar sequential color filter 300 having a cylindrical cooling fan 304 attached thereto. Although many types of color filters are used in various embodiments of the sequential color filter of FIG. 3, the embodiment show uses a set of dichroic color filters fabricated on a common substrate. The common substrate includes a hole in the hub portion 106 of the substrate.

The cylindrical fan shown in FIG. 3 is commonly referred to as a squirrel-cage fan and moves air from the inner portion of the fan to the outer portion of the fan, or vice-versa, as the fan is rotated. The motor for rotating the sequential color filter 300 of FIG. 3 is located on either side of the color filter portion of the sequential color filter. The outer housing of the fan, not shown, surrounds the impeller and is required in order for the fan to create sufficient airflow. The housing typically is an integral part of the display system housing.

All of the planar filter examples of FIGS. 1–3 provided thus far are simple to manufacture. Unfortunately, the planar filters tend to be difficult to miniaturize since smaller color filters require the light path to be moved closer to the hub portion 106. As the light path is moved closer to the axis of rotation, the spokes, or interfaces between adjacent color filter segments, are in the light path for a longer period of time. The longer the spoke is in the light path, the greater the amount of time when the light filtered by the sequential color filter is a mixture of two colors. Also, the light commonly comes to focus on the color filters and diverges afterwards. Clearance for the light convergence and divergence, as well as clearance for the structure of the color filter itself, is required.

In systems that do not image the color filter onto the modulator, the mixture of two or more colors of light limits the brightness of saturated colors since a great deal of the light cannot be used to form the saturated colors. The data provided to a given modulator element must be synchronized to the color of light that is provided to that modulator element. In systems that image the color wheel onto the modulator, the data must track the image of the spokes across the modulator. This is difficult in display systems that use small planar sequential color filters since the image of the spoke sweeps across the face of the modulator at a constantly changing angle. Most spatial light modulator arrays are arranged as orthogonal rows or columns of elements. The elements in each row or column are addressed in unison. If the image of the spoke crosses the modulator face at an angle, new data must be provided to the row or column each time the position of the image of the spoke changes. Since this requires an extremely high bandwidth, the row or column generally is just turned off until the image of the spoke completely crosses the row or column. If the image of the spoke crosses the face of the modulator at an angle, a large number of rows or columns must be turned off at any given time—greatly limiting the brightness of the display system. It is therefore extremely advantageous to provide a sequential color filter that provides spokes that are aligned with the spatial light modulator rows or columns.

Figure 4:
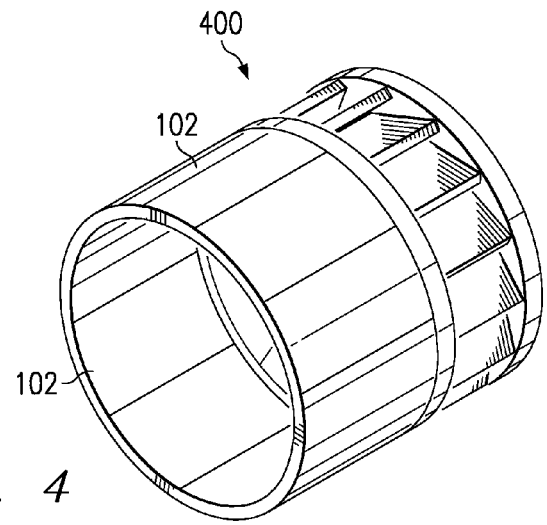
FIG. 4 is a perspective view of a cylinder sequential color filter having a fan attached thereto.

One method of providing alignment between the rows or columns of the spatial light modulator and the sequential color filter spokes is to use a cylindrical sequential color filter. FIG. 4 is a perspective view of a cylinder sequential color filter having an optional fan attached thereto. The sequential color filter 400 of FIG. 4 has filter segments 102 that are arranged in a cylinder. Thus, as the sequential color filter 400 is spun about its axis, the interfaces or spokes between adjacent color filter segments move in a direction perpendicular to the spoke itself.

The color filter segments forming the cylinder are fabricated by one of several different methods. One method of fabricating the filters uses flexible filters than are bent and held in place between one or more frames. Absorptive filters like those formed using dye and clear plastic are ideal for this method. Alternatively, dichroic filters are formed on one or more curved substrates. A single cylindrical substrate can be used as a base on which all of the filter segments are formed. As described above, the filters may be either reflective or transmissive. Transmissive filters are formed on a transparent substrate. The filters can be formed on either the inside or the outside of the glass—they typically are formed on the side illuminated by the light source. If dichroics are used, they should be designed to minimize the effect of the illumination angle which changes as the curved glass rotates through the light beam.

The sequential color filter of FIG. 4 optionally uses a cylindrical cooling fan. The cooling fan of FIG. 4 is a cylinder of essentially the same diameter as the color filter cylinder—but the two cylinders may have different diameters as well. The motor spinning the sequential color filter 400 of FIG. 4 may be mounted at either end of the filter assembly, or between the filter and the fan.

The sequential color filter 400 of FIG. 4 provides a straight spoke with a consistent angle which enables use of the sequential color filter in display systems that image the color filter segments on the surface of the spatial light modulator. Use of the sequential color filter in sequential color recycling systems, however, requires the use of a great many small filter segments. The large number of small filters typically drives up the cost of such a sequential color filter. Monolithic color wheels, which are formed by depositing filters on a monolithic substrate, provide an economical method of forming a large number of small filter segments on a single sequential color filter.

Figure 5:
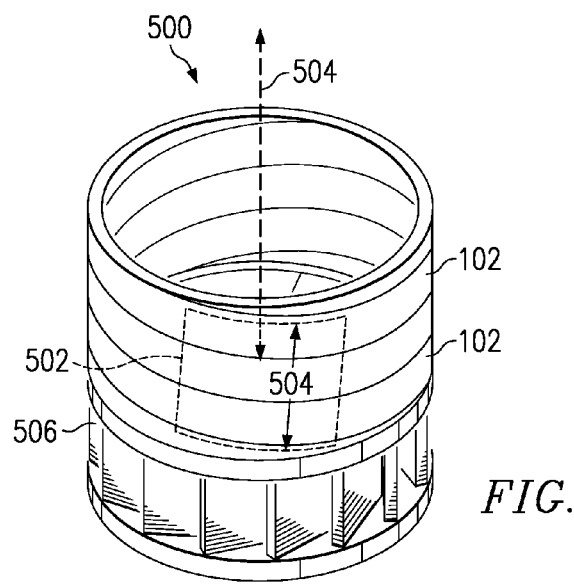
FIG. 5 is a perspective view of a cylinder sequential color filter having a fan and spiral color filter sections extending around the cylinder portion especially suited for use in a scrolling color recycling system.

FIG. 5 is a perspective view of a cylinder sequential color filter having a fan and spiral color filter sections extending around the cylinder portion. The sequential color filter 500 of FIG. 5 is especially suited for use in a sequential color recycling systems. As few as three spiraling color segments can be used to form the filter cylinder.

The dashed rectangular outline 502 in FIG. 5 shows the outline of the light path used for a sequential color recycling system. As the sequential color filter 500 is rotated, the interfaces or spokes between adjacent filter segments move across the light path, and thus across the face of the spatial light modulator, in the directions shown by arrow 504. The actual direction depends on the direction in which the filter cylinder is rotated.

As with the sequential color filter of FIG. 4, the color filter segments forming the sequential color filter 500 of FIG. 5 are fabricated by one of several different methods. One method of fabricating the filters uses flexible filters than are bent and held in place between one or more frames. Absorptive filters like those formed using dye and clear plastic are ideal for this method. Alternatively, dichroic filters are formed on one or more curved substrates. A single cylindrical substrate can be used as a base on which all of the filter segments are formed. As described above, the filters may be either reflective or transmissive. Transmissive filters are formed on a transparent substrate. The filters can be formed on either the inside or the outside of the glass—they typically are formed on the side illuminated by the light source. If dichroics are used, they should be designed to minimize the effect of the illumination angle which changes as the curved glass rotates through the light beam.

Although three individual color filter segments are shown in FIG. 5, any other number of color filter segments can be used. As is the case with all of the sequential color filters disclosed herein, the filters are typically arranged in groups of the three colors used, although some embodiments use additional colored or clear filter segments. For example, additional red segments may be used in systems that use light sources that do not emit a large amount of red light. Additionally, clear segments are used in some systems to provide a white light beam to boost the overall brightness of an image.

The sequential color filter of FIG. 5 optionally uses a cylindrical cooling fan. The cooling fan of FIG. 5 is a cylinder of the same diameter as the color filter cylinder—but the two cylinders may have different diameters as well. The motor spinning the sequential color filter 500 of FIG. 5 may be mounted at either end of the filter assembly, or between the filter and the fan.

Figure 6:
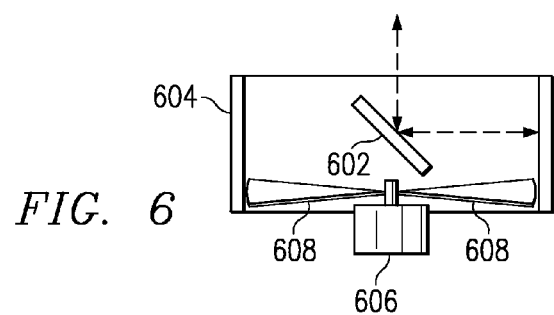
FIG. 6 is a cross section side view of a cylinder sequential color filter showing a fold mirror inside the sequential color filter.

When a cylindrical sequential color filter is used, it generally is necessary to use some sort of fold mechanism to redirect the light inside the cylinder. Typically a fold mirror or other fold mechanism is used to fold the light path from a direction parallel to the axis of the cylinder to a direction perpendicular to the axis—or vice versa. FIG. 6 is a cross section side view of a cylinder sequential color filter 600 showing a fold mirror 602 inside the sequential color filter. As discussed below, the fold mirror 602 may be replaced or augmented by an integrating rod. Depending on the direction of the white light beam—either from the inside to the outside of the cylinder, or from the outside to the inside of the cylinder 604—the fold mirror folds the light path to allow efficient positioning of the optical components. The internal space of the cylinder is used by the optical path and can contain other optical components rather than just being empty space.

The sequential color filter 600 of FIG. 6 also includes a motor 606 to spin the cylinder 604. Optionally formed in or attached to one end of the cylinder are fan blades 608, which could also function as spokes to attach the cylinder 602 to the motor 606. Thus, when the motor spins the sequential color filter 600, the fan blades 608 provide a cooling stream of air along the axis of rotation.

Figure 7:
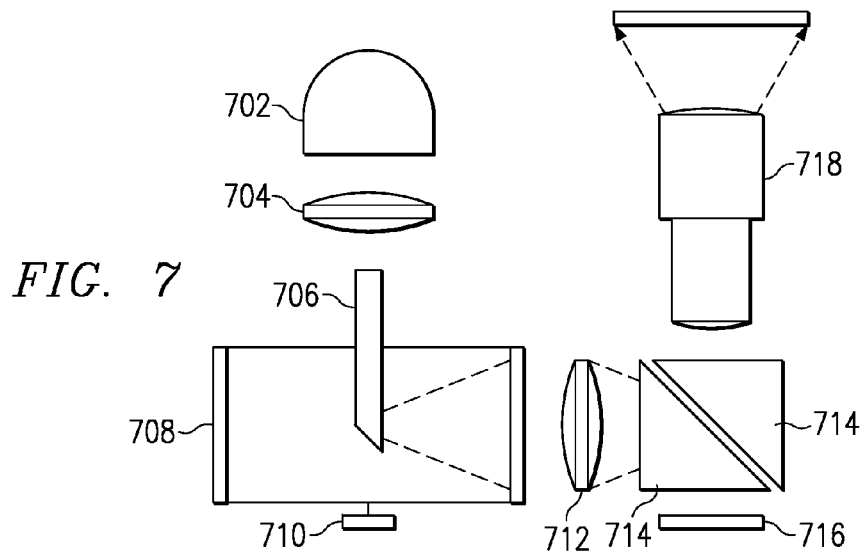
FIG. 7 is a view of a projection display system showing a beveled integrating rod inside a cylinder sequential color filter.

FIG. 7 is a view of a typical projection display system showing a beveled integrating rod inside a cylinder sequential color filter. In FIG. 7, a light source 702 provides a beam of white light along a light path. A condenser lens 704, or set of lenses, focuses the beam of white light onto the aperture of an integrating rod 706.

The integrating rod 706 shown in FIG. 7, as well as integrating rods in other figures, may be any type of integrating rod. Common integrating rods are solid pieces of glass or other optically conductive material such as acrylic resin. Solid integrating rods typically rely on total internal reflection to reflect the light traveling through the integrating rod although mirrored surfaces may be used. Alternatively, many integrating rods are hollow structures having internal mirrored surfaces to reflect the light. As the light travels along the integrating rod 706, it is homogenized by multiple reflections from the walls of the integrating rod 706.

After exiting the integrating rod 706, the light is redirected by a fold mirror to pass through the cylinder formed by the sequential color filter 708. Alternatively, as shown, the integrating rod 706 has a beveled end to direct the light traveling through the interior of the integrating rod 706 through the cylinder. Motor 710 turns the sequential color filter to cause each of the color filters forming the cylinder to pass through the light path and filter the light beam.

After passing through the cylinder of color filters, the light is focused by another lens 712 or set of lenses and enters a prism pair 714. The prism pair 714 is shown only for purposes of illustration and not for purposes of limitation. Many other prism configurations are possible, as are display systems that do not use prisms at all. The sequentially colored beams of filtered light enter the prism pair 714 and reflect at the interface between the prisms.

The reflected light strikes a spatial light modulator 716 and is selectively modulated by the spatial light modulator 716. The spatial light modulator 716 may be any suitable modulator, such as a micromirror device, a liquid crystal device, etc. The modulated light then passes through the prism pair 714 and is focused by a projection lens 718 onto an image plane.

Figure 8:
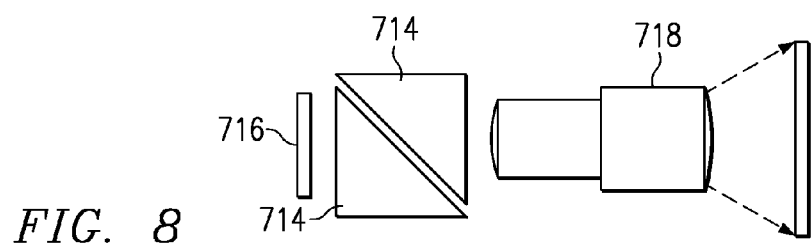
FIG. 8 is a view of a projection display system showing an integrating rod outside a cylindrical sequential color filter and a fold mirror inside the cylinder.

FIG. 8 is a view of another typical projection display system 800 showing an integrating rod outside a cylindrical sequential color filter and a fold mirror inside the cylinder. In FIG. 8, a light source 702 provides a beam of white light along a light path. A condenser lens 704, or set of lenses, focuses the beam of white light onto the aperture of an integrating rod 706. As the light travels along the integrating rod 706, it is homogenized by multiple reflections from the walls of the integrating rod 706. After exiting the integrating rod 706, the light passes through the cylinder formed by the sequential color filter 708. Motor 710 turns the sequential color filter to cause each of the color filters forming the cylinder to pass through the light path and filter the light beam.

After passing through the cylinder of color filters, fold mirror 711 folds the optical path of the light and the light is focused by another lens 712 or set of lenses and before entering a prism pair 714. The prism pair 714 is shown only for purposes of illustration and not for purposes of limitation. Many other prism configurations are possible, as are display systems that do not use prisms at all. The sequentially colored beams of filtered light enter the prism pair 714 and reflect at the interface between the prisms.

Figure 9:
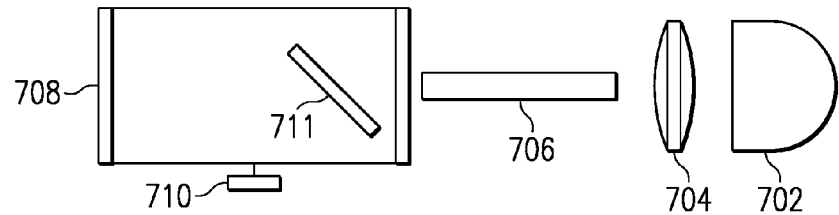
FIG. 9 is a cross section side view of a portion of a projection display system having an integrating rod and a fold mirror 904 inside a cylindrical sequential color filter.
Figure 9:
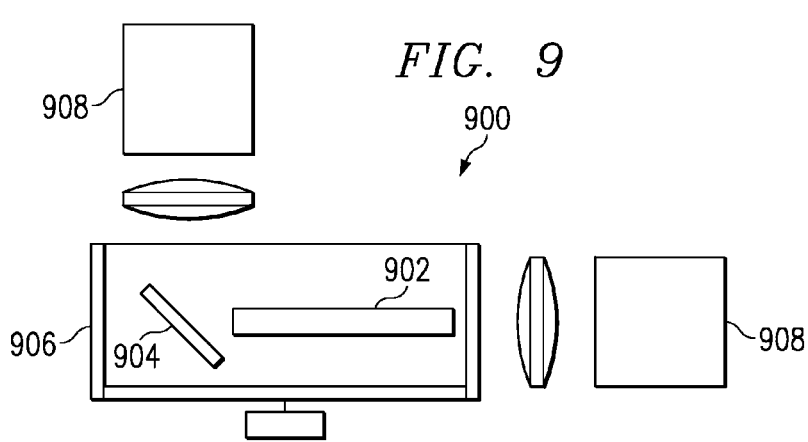

FIG. 9 is a cross section side view of a portion of a typical projection display system 900 showing an integrating rod 902 and a fold mirror 904 inside a cylindrical sequential color filter 906. In FIG. 9, light can travel in either direction along the light path—either from a light source through the color filter 906 to the integrating rod 902, or from a light source to the fold mirror 904, through the integrating rod 902 and then through the color filter 906. Because the light path may be designed to transmit the illumination light in either direction, block 908 will be used to represent both the light source and the remainder of the optical path, such as the TIR prism, modulator, and projection lens shown in FIG. 8. Like all of the other integrating rods described herein, integrating rod 902 may be either a solid rod or a hollow structure.

Figure 10:
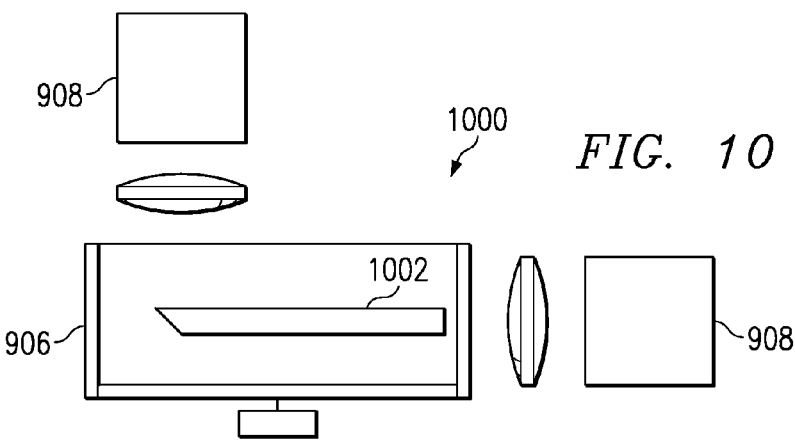
FIG. 10 is a cross section side view of a portion of a projection display system having an integrating rod with a beveled end inside a cylindrical sequential color filter.

FIG. 10 is a cross section side view of a portion of a typical projection display system 1000 showing an integrating rod 1002 having a beveled end inside a cylindrical sequential color filter 906. In FIG. 10, light can travel in either direction along the light path—either from a light source through the color filter 906 to the integrating rod 1002 and out the beveled end of the integrating rod 1002, or from a light source into the beveled end of the integrating rod 1002 and then through the color filter 906.

Figure 11:
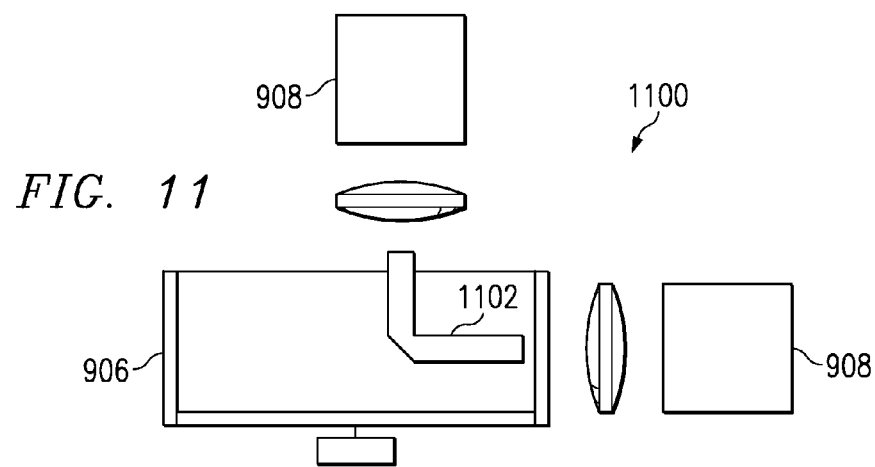
FIG. 11 is a cross section side view of a portion of a projection display system having a folded integrating rod inside a cylindrical sequential color filter.

FIG. 11 is a cross section side view of a portion of a typical projection display system 1100 showing a folded integrating rod 1102 inside a cylindrical sequential color filter 906. In FIG. 11, light can travel in either direction along the light path—either from a light source through the color filter 906 to the integrating rod 1102, or from a light source through the integrating rod 1102 and then through the color filter 906. Although shown as a 90° fold, the fold in the integrating rod 1102 may have another angle.

Figure 12:
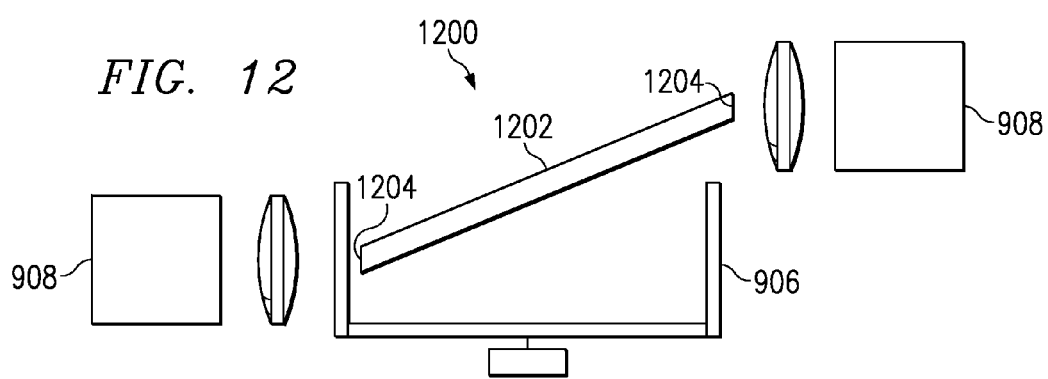
FIG. 12 is a cross section side view of a portion of a projection display system having an angled integrating rod inside a cylindrical sequential color filter.

FIG. 12 is a cross section side view of a portion of a typical projection display system 1200 showing an angled integrating rod 1202 inside a cylindrical sequential color filter 906. In FIG. 12, light can travel in either direction along the light path—either from a light source through the color filter 906 to the integrating rod 1202, or from a light source through the integrating rod 1202 and then through the color filter 906. The entrance and exit faces 1204 of the integrating rod 1202 typically are parallel. The integrating rod of FIG. 12 allows the illumination system to maintain a nearly linear light path. The system shown in FIG. 12 is also able to use an integrator rod 1202 that is longer than the diameter of the color filter 906.

Thus, although there has been disclosed to this point a particular embodiment for a sequential color filter and method, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A sequential color filter comprising:
a set of at least three color filters substantially in a plane; and
an axial fan substantially in said plane connected to said set of color filters and rotating about an axis substantially perpendicular to said plane.

2. The sequential color filter of claim 1, said set of color filters comprising:
a red filter;
a green filter; and
a blue filter.

3. The sequential color filter of claim 2, said set of color filters further comprising:
a clear filter.

4. The sequential color filter of claim 2, said set of color filters further comprising:
at least two red filters.

5. The sequential color filter of claim 1, said set of color filters comprising:
a cyan filter;
a magenta filter; and
a yellow filter.

6. The sequential color filter of claim 5, further comprising:
a clear filter.

7. The sequential color filter of claim 1, said set of color filters comprising:
a set of dichroic color filters.

8. The sequential color filter of claim 1, said set of color filters comprising:
a set of dichroic color filters deposited on a transparent substrate.

9. The sequential color filter of claim 1, said set of color filters comprising:
a set of color filters forming a circular planar surface.

10. The sequential color filter of claim 1, said set of color filters comprising:
a set of color filters forming a circular planar surface around a central fan.

11. The sequential color filter of claim 1, said set of color filters comprising:
a set of color filters forming a circular planar surface inside a peripheral fan.

12. The sequential color filter of claim 1, comprising:
a motor for rotating said set of color filters and said cooling fan about a common axis.

13. A sequential color filter comprising:
a first color filter;
a second color filter;
a third color filter;
said first, second, and third color filters forming a cylindrical set of color filters; and
a cooling fan appended to said set of color filters.

14. The sequential color filter of claim 13, further comprising:
a motor for rotating said set of color filters.

15. The sequential color filter of claim 13, said set of color filters comprising:
a red filter;
a green filter; and
a blue filter.

16. The sequential color filter of claim 15, said set of color filters further comprising:
a clear filter.

17. The sequential color filter of claim 15, said set of color filters further comprising:
at least two red filters.

18. The sequential color filter of claim 13, said set of color filters comprising:
a cyan filter,
a magenta filter; and
a yellow filter.

19. The sequential color filter of claim 18, further comprising:
a clear filter.

20. The sequential color filter of claim 13, said set of color filters comprising:
a set of dichroic color filters.

21. The sequential color filter of claim 13, said set of color filters comprising:
a set of dichroic color filters deposited on a transparent substrate.

22. The sequential color filter of claim 13, said set of color filters comprising:
a set of color filters arranged in a cylinder configuration with a central cooling fan portion.

23. The sequential color filter of claim 13, said set of color filters comprising:
a set of color filters arranged in a cylinder configuration with a planar central cooling fan portion.

24. The sequential color filter of claim 13, said set of color filters comprising:
a set of color filters arranged in a cylinder configuration with a appended cooling fan portion.

25. The sequential color filter of claim 13, wherein each color filter forms a spiral around said cylinder.

26. A sequential color filter comprising:
a first color filter,
a second color filter; and
a third color filter, wherein said first, second, and third color filters comprise a set of at least three color filters forming a cylinder.

27. The sequential color filter of claim 26, further comprising:
a motor for rotating said set of color filters.

28. The sequential color filter of claim 26, said set of color filters comprising:
a red filter,
a green filter; and
a blue filter.

29. The sequential color filter of claim 28, said set of color filters further comprising:
a clear filter.

30. The sequential color filter of claim 28, said set of color filters further comprising:
at least two red filters.

31. The sequential color filter of claim 26, said set of color filters comprising:
a cyan filter;
a magenta filter; and
a yellow filter.

32. The sequential color filter of claim 31, further comprising:
a clear filter.
33. The sequential color filter of claim 26, said set of color filters comprising:
a set of dichroic color filters.
34. The sequential color filter of claim 26, said set of color filters comprising:
a set of dichroic color filters deposited on a transparent substrate.
35. The sequential color filter of claim 26, said set of color filters comprising:
a set of color filters forming a circular planar surface.
36. The sequential color filter of claim 26, said set of color filters comprising:
a set of color filters forming a circular planar surface around a central cooling fan.
37. The sequential color filter of claim 26, said set of color filters comprising:
a set of color filters forming a circular planar surface inside a peripheral cooling fan.
38. The sequential color filter of claim 26, said set of color filters comprising:
a set of color filters arranged in a cylinder configuration.
39. The sequential color filter of claim 26, said set of color filters comprising:
a set of color filters arranged in a cylinder configuration with a central cooling fan portion.
40. The sequential color filter of claim 26, said set of color filters comprising:
a set of color filters arranged in a cylinder configuration with a planar central cooling fan portion.
41. The sequential color filter of claim 26, said set of color filters comprising:
a set of color filters arranged in a cylinder configuration with a appended cooling fan portion.
42. The sequential color filter of claim 26, wherein each color filter forms a spiral around said cylinder.
43. The sequential color filter of claim 42, each color filter forming a spiral portion of said cylinder.
44. A display system comprising:
a light source for generating a beam of white light along a light path;
a sequential color filter for sequentially filtering the beam of white light, said sequential color filter comprising:
a set of at least three color filters substantially in a plane; and
a cooling fan substantially in said plane connected to said set of color filters;
a motor for rotating said set of color filters and said cooling fan about a common axis;
a spatial light modulator for selectively modulating said filtered beam of light, and
a projection lens for focusing said modulated light onto an image plane.
45. The display system of claim 44, further comprising:
an integrating rod conducting said beam of white light from said light source to said sequential color filter.
46. The display system of claim 44, further comprising:
a solid integrating rod conducting said beam of white light from said light source to said sequential color filter.
47. The display system of claim 44, further comprising:
a hollow integrating rod conducting said beam of white light from said light source to said sequential color filter.
48. The display system of claim 44, further comprising:
an integrating rod conducting said beam of white light from said light source to said sequential color filter, said integrating rod having a beveled end.
49. The display system of claim 44, further comprising:
an integrating rod conducting said sequentially filtered beam light from said sequential color filter to said spatial light modulator.
50. The display system of claim 44, further comprising:
a solid integrating rod conducting said sequentially filtered beam light from said sequential color filter to said spatial light modulator.
51. The display system of claim 44, further comprising:
a hollow integrating rod conducting said sequentially filtered beam light from said sequential color filter to said spatial light modulator.
52. The display system of claim 44, further comprising:
an integrating rod conducting said sequentially filtered beam of light from said sequential color filter to said spatial light modulator, said integrating rod having a beveled end.
53. The display system of claim 44, said set of color filters comprising:
a red filter;
a green filter; and
a blue filter.
54. The sequential color filter of claim 53, said set of color filters further comprising:
a clear filter.
55. The sequential color filter of claim 53, said set of color filters further comprising:
at least two red filters.
56. The display system of claim 44, said set of color filters comprising:
a cyan filter;
a magenta filter; and
a yellow filter.
57. The sequential color filter of claim 56, further comprising:
a clear filter.
58. The display system of claim 44, said set of color filters comprising:
a set of dichroic color filters.
59. The display system of claim 44, said set of color filters comprising:
a set of dichroic color filters deposited on a transparent substrate.
60. The display system of claim 44, said set of color filters comprising:
a set of color filters forming a circular planar surface.
61. The display system of claim 44, said set of color filters comprising:
a set of color filters forming a circular planar surface around a central cooling fan.
62. The display system of claim 44, said set of color filters comprising:
a set of color filters forming a circular planar surface inside a peripheral cooling fan.
63. The display system of claim 44, said set of color filters comprising:
a set of color filters arranged in a cylinder configuration.
64. A display system comprising:
a light source for generating a beam of white light;
a sequential color filter for sequentially filtering said beam of white light, said sequential color filter comprising a set of at least three color filters forming a cylinder, a cooling fan;

a motor for rotating said set of color filters and said cooling fan about a common axis;

a spatial light modulator for selectively modulating said sequentially colored beams of light, and a projection lens for focusing said modulated light onto an image plane.

65. The display system of claim 64, said sequential color filter forming a cylinder, wherein each color filter forms a spiral around said cylinder.

66. The display system of claim 64, further comprising a cooling fan.

67. The display system of claim 64, further comprising:

an integrating rod conducting said beam of white light from said light source to said sequential color filter.

68. The display system of claim 64, further comprising:

a solid integrating rod conducting said beam of white light from said light source to said sequential color filter.

69. The display system of claim 64, further comprising:

a hollow integrating rod conducting said beam of white light from said light source to said sequential color filter.

70. The display system of claim 64, further comprising:

an integrating rod conducting said beam of white light from said light source to said sequential color filter, said integrating rod having a beveled end.

71. The display system of claim 64, further comprising:

an integrating rod conducting said sequentially filtered beam light from said sequential color filter to said spatial light modulator.

72. The display system of claim 64, further comprising:

a solid integrating rod conducting said sequentially filtered beam light from said sequential color filter to said spatial light modulator.

73. The display system of claim 64, further comprising:

a hollow integrating rod conducting said sequentially filtered beam light from said sequential color filter to said spatial light modulator.

74. The display system of claim 64, further comprising:

an integrating rod conducting said sequentially filtered beam of light from said sequential color filter to said spatial light modulator, said integrating rod having a beveled end.

75. The display system of claim 64, said sequential color filter forming a cylinder, said display system further comprising:

a fold mirror in said cylinder.

76. The display system of claim 64, said sequential color filter forming a cylinder, said display system further comprising:

an integrating rod in said cylinder on said light path.

77. The display system of claim 64, said sequential color filter forming a cylinder, said display system further comprising:

an integrating rod having a beveled end in said cylinder on said light path.

78. The display system of claim 64, said sequential color filter forming a cylinder, said display system further comprising:

a folded integrating rod having a beveled end in said cylinder on said light path.

79. The display system of claim 64, said sequential color filter forming a cylinder, said display system further comprising:

an angled integrating rod having a beveled end in said cylinder on said light path.

80. The display system of claim 64, said sequential color filter forming a cylinder, said display system further comprising:

a prism assembly for directing said sequentially filtered beams of light to said spatial light modulator, and for directing said modulated light to said projection lens.

81. The display system of claim 64, said sequential color filter forming a cylinder, wherein each color filter forms a spiral around said cylinder.

82. The display system of claim 64, said set of color filters comprising:

a red filter;

a green filter; and a blue filter.

83. The sequential color filter of claim 82, said set of color filters further comprising:

a clear filter.

84. The sequential color filter of claim 82, said set of color filters further comprising:

at least two red filters.

85. The display system of claim 64, said set of color filters comprising:

a cyan filter a magenta filter; and a yellow filter.

86. The sequential color filter of claim 85, further comprising:

a clear filter.

87. The display system of claim 64, said set of color filters comprising:

a set of dichroic color filters.

88. The display system of claim 64, said set of color filters comprising:

a set of dichroic color filters deposited on a transparent substrate.

89. The display system of claim 64, said set of color filters comprising:

a set of color filters forming a circular planar surface.

90. The display system of claim 64, said set of color filters comprising:

a set of color filters forming a circular planar surface around a central cooling fan.

91. The display system of claim 64, said set of color filters comprising:

a set of color filters forming a circular planar surface inside a peripheral cooling fan.

92. The display system of claim 64, said set of color filters comprising:

a set of color filters arranged in a cylinder configuration with a central cooling fan portion.

93. The display system of claim 64, said set of color filters comprising:

a set of color filters arranged in a cylinder configuration with a planar central cooling fan portion.

94. The display system of claim 64, said set of color filters comprising:

a set of color filters arranged in a cylinder configuration with a appended cooling fan portion.

* * * * *